US006920400B2

(12) United States Patent
Lonigro et al.

(10) Patent No.: US 6,920,400 B2
(45) Date of Patent: Jul. 19, 2005

(54) METHOD AND APPARATUS FOR DETECTING A PLUGGED PORT

(75) Inventors: Dennis A. Lonigro, Needham, MA (US); David J. Wilbur, Braintree, MA (US); Dale A. Zeskind, Wayland, MA (US)

(73) Assignee: United Electric Controls Co., Watertown, MA (US)

( * ) Notice: Subject to any disclaimer, the term of this patent is extended or adjusted under 35 U.S.C. 154(b) by 151 days.

(21) Appl. No.: 10/027,361

(22) Filed: Dec. 20, 2001

(65) Prior Publication Data

US 2003/0120436 A1 Jun. 26, 2003

Related U.S. Application Data

(63) Continuation-in-part of application No. 09/290,298, filed on Apr. 13, 1999, now Pat. No. 6,339,373.

(60) Provisional application No. 60/083,946, filed on May 1, 1998.

(51) Int. Cl.[7] .................................................. G01F 1/00

(52) U.S. Cl. ........................... 702/45; 73/1.02; 73/1.57; 73/1.59; 73/1.34

(58) Field of Search ............................. 702/45; 73/1.02, 73/1.57, 1.59, 1.34

(56) References Cited

U.S. PATENT DOCUMENTS 3,917,907 A 11/1975 Bartelink
4,072,934 A * 2/1978 Hiller et al. ................ 340/608
4,149,213 A 4/1979 Flemons
4,168,443 A 9/1979 Periot
4,555,712 A * 11/1985 Arway et al. .................. 347/7
4,668,948 A * 5/1987 Merkel ........................ 340/606
4,780,788 A 10/1988 Kammerer et al.
5,182,938 A * 2/1993 Merkel ...................... 73/19.05
5,760,498 A 6/1998 Park
5,825,233 A 10/1998 Lamarche et al.
5,831,349 A 11/1998 Weng
5,995,909 A * 11/1999 Bretmersky et al. .......... 702/50
6,339,373 B1 * 1/2002 Zeskind et al. ............. 340/534

FOREIGN PATENT DOCUMENTS

WO WO 9957693 A1 * 11/1999 ........... G08B/5/00

* cited by examiner

*Primary Examiner*—John Barlow
*Assistant Examiner*—Anthony T. Dougherty
(74) *Attorney, Agent, or Firm*—Wolf, Greenfield & Sacks, P.C.

(57) ABSTRACT

A method and apparatus for detecting and clearing a plugged sensor port in a system containing a fluid being monitored through the sensor port. The method comprises establishing a range beyond which a fluid variable is expected to vary within a predetermined time interval, measuring the fluid variable, and indicating a plugged sensor port in response to the measured fluid variable remaining within the range for the predetermined time interval. The apparatus includes a sensor mechanism that senses a fluid variable, and a controller. The controller establishes the range beyond which the fluid variable is expected to vary within a predetermined time interval, determines whether the fluid variable is within the range, and indicates a plugged sensor port in response to the fluid variable remaining within the range for the predetermined time interval. The apparatus may further include a mechanism that clears the plugged sensor port.

44 Claims, 8 Drawing Sheets

METHOD AND APPARATUS FOR DETECTING A PLUGGED PORT

RELATED APPLICATIONS

This application is a continuation-in-part of application Ser. No. 09/290,298 filed Apr. 13, 1999, now U.S. Pat. No. 6,339,373, which claims priority from provisional specification No. 60/083,946, filed May 1, 1998.

FIELD OF THE INVENTION

The present invention is directed toward a method and apparatus for detecting a plugged sensor port connection in a system running a process, and a method and apparatus for clearing the port.

BACKGROUND OF THE INVENTION

There are many industrial process applications in which a system contains a fluid (i.e., a liquid, gas or other substance, for example, a gel) that is monitored by a sensor mechanism through a sensor port in the apparatus. The sensor mechanism may monitor various variables relating to the fluid, such as for example the temperature, pressure or flow speed of the fluid. If at any time the sensor port becomes obstructed by, for example, debris in the fluid, this may influence sensor mechanism inputs, resulting in the sensor mechanism providing erroneous measurements. In many applications, accurate, reliable measurements may be critical to the safety and/or operation of the process. Therefore, it may be desirable to be able to detect an obstructed sensor port. In some applications, it may also be desirable to be able to automatically clear such an obstruction.

SUMMARY OF THE INVENTION

According to one embodiment, a method of detecting a plugged sensor port in a system containing a fluid being monitored is provided. The method comprises establishing a range beyond which a variable of the fluid is expected to vary within a predetermined time interval, measuring the fluid variable to provide a measured fluid variable, and indicating a plugged sensor port in response to the measured fluid variable remaining within the range for the predetermined time interval.

In one example, the method for detecting a plugged port connection in a fluid-containing apparatus involved in a process comprises measuring a fluid variable through the port to provide a measured fluid variable, and determining a range, based on the measured fluid variable, beyond which the fluid variable is expected to vary in a predetermined time interval. The method further comprises re-measuring the fluid variable, and indicating that the port connection is plugged responsive to the fluid variable remaining within the range for the predetermined time interval.

One embodiment of a device that detects a plugged sensor port in a system containing a fluid being monitored comprises a sensor mechanism that senses a fluid variable through the sensor port, and a controller that establishes a range beyond which the fluid variable is expected to vary within a predetermined time interval. The controller also determines whether the fluid variable is within the range, and indicates a plugged sensor port in response to the fluid variable remaining within the range for the predetermined time interval. The device may further include a mechanism that clears the plugged sensor port connection, such as, for example, a piezoelectric sensor/vibrator, an ultrasonic vibrator, a pinch valve mechanism, a heater, a solvent, a rotatable vane or auger, etc.

The controller may establish the predetermined time interval based on characteristics of the process being monitored. The controller may further comprise a timer to monitor the predetermined time interval and a comparator that compares the fluid variable with an upper threshold value and a lower threshold value of the range to determine whether the fluid variable is within the range.

Another embodiment of a device for detecting a plugged port connection in a system monitoring a process comprises a sensor that measures a fluid variable, and a first means, such as a circuit or sequence of instructions forming part of an algorithm, for determining a range beyond which the fluid variable is expected to vary during a predetermined time interval. The device further comprises a second means, for example, a circuit or microprocessor, coupled to the sensor, for determining whether the fluid variable is within the range, and a third means, such as, for example, an output signal, a display, an audio output, etc., for providing an indication of a plugged port responsive to the fluid variable remaining within the range for the predetermined time interval. The device may also include means for clearing the plugged port, such as, for example, a piezoelectric sensor/vibrator, an ultrasonic vibrator, a pinch valve mechanism, a heater, a solvent, a rotatable vane or auger, etc.

In another embodiment, a method is provided for detecting and clearing a plugged sensor port connection in a system containing a fluid being monitored via the sensor port. The method comprises measuring a fluid variable to provide a measured fluid variable, detecting the plugged sensor port based on the measured fluid variable remaining within a predetermined range for a predetermined period of time, and actuating a clearing device to clear the plugged sensor port responsive to the plugged sensor port being detected.

According to yet another embodiment, there is provided a computer readable medium encoded with at least one program for execution on at least one processor, the program performing a method for detecting a plugged port connection in a system relating to a process being monitored. The method comprises the steps of establishing an operating value of a fluid variable, and determining a range beyond which the fluid variable is expected to vary within a predetermined time interval. The method further comprises measuring the fluid variable, determining whether the fluid variable is within the range, and indicating a plugged port condition in response to the fluid variable remaining within the range for the predetermined time interval.

The foregoing and other objects and advantages of the invention will be apparent from the following more detailed description and Figures.

BRIEF DESCRIPTION OF THE DRAWINGS

In the drawings in which like numerals represent like elements.

DETAILED DESCRIPTION

Figure 1:
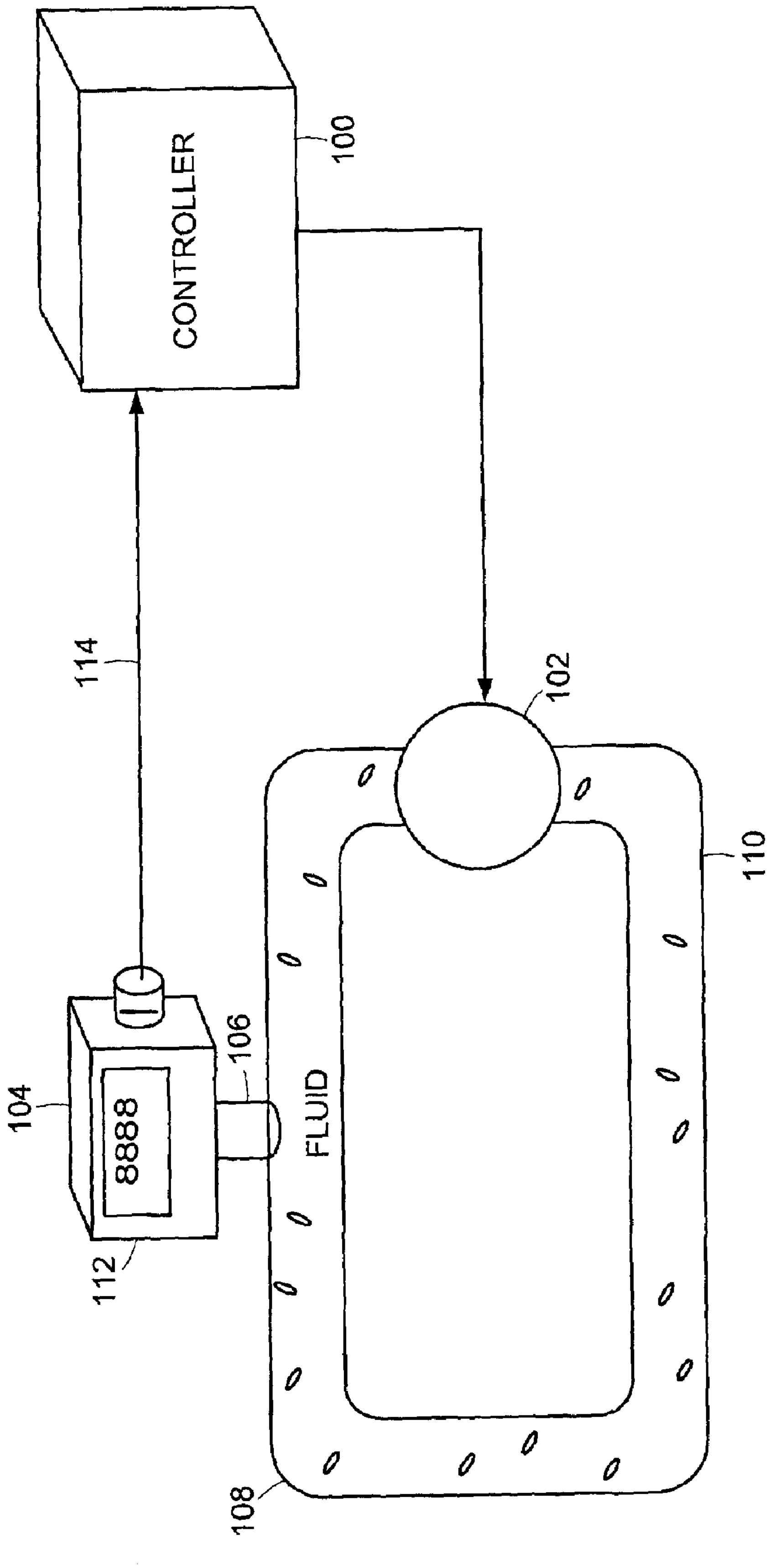
FIG. 1 is a schematic block diagram illustrating an industrial process application in which teachings of the invention may be utilized.

Various illustrative embodiments, and aspects thereof, will now be described in reference to the accompanying figures. FIG. 1 is a schematic block diagram illustrating an exemplary process application in which the teachings of the present invention may be utilized. The illustrated system includes a controller 100 that may control a system 110 running a process. The apparatus includes equipment, for example a pump 102, that may control a level, flow, or some other characteristic of a fluid contained in the apparatus. A sensor mechanism 104 is connected to the apparatus containing the fluid via a sensor port 106. The sensor mechanism may be used to monitor a fluid variable, such as the pressure or temperature of the fluid in the apparatus. The sensor mechanism may include a display 112 to display information, such as a measured value of the fluid variable. The sensor mechanism 104 is in communication with the controller via a communication link 114, for example, a two wire connection, a wireless link, an optical link, or via some other communication method. The controller may control the apparatus containing the fluid based on information received from the sensor mechanism. In many situations, there may be debris 108 in the fluid. This debris may enter the sensor port 106, and may obstruct or plug the port, resulting in the sensor mechanism providing potentially erroneous readings of the fluid variable being measured. Since reliable, accurate information may be critical to the safety and outcome of the process, it may be desirable to detect when the sensor connection port is badly obstructed or plugged (hereinafter "plugged"). A device for automatically clearing a detected plugged port may also be desirable.

Typically, in any process containing a fluid, there are, when the process is running normally, random fluctuations over time in fluid variables relating to the process, such as the pressure or temperature of the fluid. An absence of such fluctuations during a predetermined time interval may indicate that the sensor port allowing the sensor mechanism access to the process has become plugged due, for example, to debris in the fluid. Accordingly, a plugged sensor port may be detected by monitoring the fluid variable being sensed, for example pressure, over time. Provided sufficient fluctuations in the fluid variable are detected during a predetermined time interval, the port may be assumed to be clear. A lack of fluctuations in the fluid variable during the predetermined time interval may indicate that the port is plugged and possibly that corrective action should be taken. However, it is to be appreciated that a lack of fluctuations may also indicate that the process has stopped running, or that a fault, other than a plugged sensor port, has occurred. Alternatively, as statistically there may be times when the fluid variable does not vary by the amount expected, the lack of fluctuations during a relatively short period of time may not be indicative of a fault condition.

Figure 2:
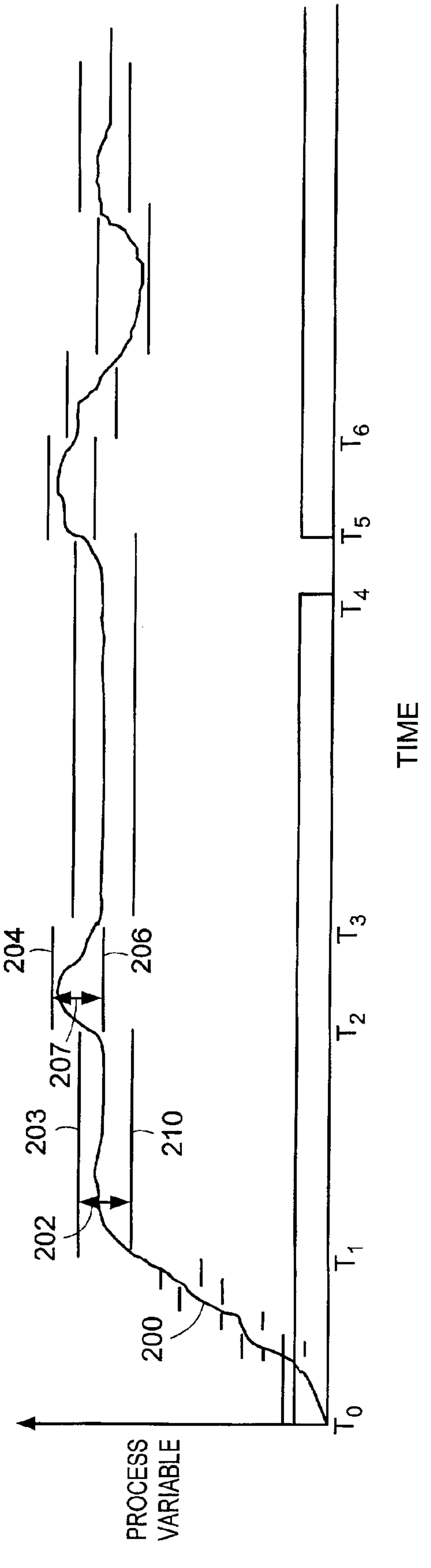
FIG. 2 is a graph illustrating a typical fluid variable measurement versus time.

FIG. 2 is a graph of illustrative fluid variable measurements versus time. According to the illustrated example, a fluid variable may be seen to ramp up from the start of the process to a nominal operating value during a time interval T1. Once having reached the nominal operating value, the fluid variable is expected to fluctuate within a certain range 202 during a given time interval (t). The range and time interval may vary depending on the process, the fluid and other factors, and may be calculated, estimated or determined empirically. The time interval (t) is application-specific and may be, for example, a few seconds in some applications, or a few hours, or even days, in other applications. As the fluid variable fluctuates, this expected range of variation may be recalculated, as illustrated. For example, when the measured fluid variable exceeds an upper threshold 203 of the range, the range is recalculated about the current measured value of the fluid variable. A new range 207 is thus established, having an upper threshold 204 and a lower threshold 206. The absence of such random fluctuations during the predetermined time interval (t), for example between times T3 and T4, may be indicative of a plugged port condition.

Figure 3:
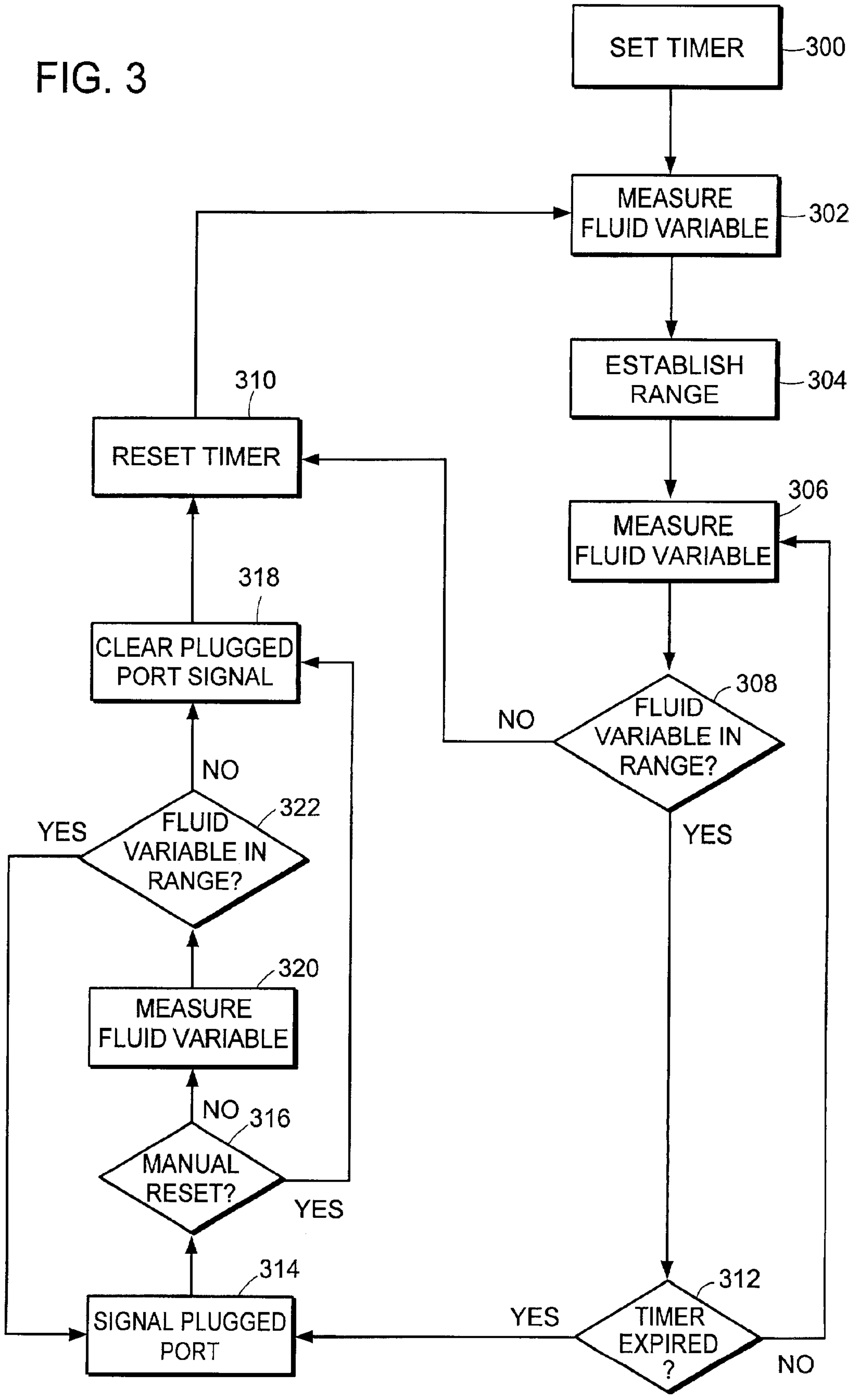
FIG. 3 is flow diagram of one example of a method for detecting a plugged port.

FIG. 3 is a flow diagram illustrating one example of a method for detecting a plugged port condition. According to this example, the method involves monitoring fluctuations of the fluid variable being sensed through the port during a predetermined time interval. A first step 300 includes setting a timer to monitor the predetermined time interval. A second step 302 comprises measuring the fluid variable and recording a measured value of the fluid variable. This step is typically performed by the sensor mechanism. The sensor mechanism includes any suitable sensor, for example, a piezoelectric sensor or bridge-type pressure sensor, to measure the fluid variable. The measured fluid variable may be recorded by maintaining a voltage on a particular terminal of the sensor mechanism. Alternatively, a voltage representing the measured fluid variable may be converted to digital data that is provided to an input of a microprocessor or programmable logic device included in the sensor mechanism. The microprocessor may store the measured fluid variable value in a memory location.

A third step 304 comprises establishing a range about the fluid variable beyond which the fluid variable is expected to vary during the preselected time interval. Referring to FIG. 2, the step of establishing the range 202 may include establishing an upper threshold 203 and a lower threshold 210. These threshold values may be chosen such that, under normal operating conditions, a fluid variable 200 that was initially measured to fall within the range 202 should either be measured to be above threshold 203 or below threshold 210 at some point during the predetermined time interval. These threshold values, and thus the range, may be calculated as a certain percentage of the measured fluid variable value, as a certain fixed amount above and below the measured fluid variable value, or using some other criteria. The range may be centered about the measured fluid variable value, but need not be. In one example, the range may always be calculated as a certain predetermined percentage of the measured fluid variable value, or fixed amount above and below the measured fluid variable value, regardless of the measured fluid variable. Alternatively, the range and criteria for establishing the range may be adjustable based on characteristics of the fluid variable, which may be learned over time. For example, the range may expand or contract based on the measured fluid variable. Thus, if, for example, the measured fluid variable is above a certain value, the range may be expanded correspondingly if it is known that a higher measured fluid variable implies larger fluctuations, or vice versa. The sensor mechanism may include a microprocessor, or other programmable device, that records the measured fluid variable and monitors fluctuations in order to learn characteristics of the fluid variable. The microprocessor may then adjust the range based on the characteristics learned.

The controller may further include an operator interface to allow a user to view information, and to input information to the controller. In particular, a user may input a desired range and/or time interval. The controller may provide a control signal responsive to the user input to program one or both of the range and the predetermined time interval.

Referring again to FIG. 3, step 306 of measuring the fluid variable again is then performed, followed by a step 308 which determines whether the measured fluid variable is within the established range. This may be implemented in numerous ways, in software or in hardware. For example, the sensor mechanism may include a comparator that compares a set voltage, proportional to the upper or lower threshold value, on one of its terminals with a voltage at another terminal proportional to the measured fluid variable value, and outputs a signal based on the comparison. Thus, the output signal indicates whether the voltage representing the measured fluid variable is greater or less than the voltage representing the threshold value. The sensor mechanism may include two comparators so as to be able to compare the measured fluid variable with both the upper and lower thresholds.

According to another example, the sensor mechanism may include a microprocessor and the comparison may be performed by the microprocessor. The microprocessor may have digital values representing the upper and lower thresholds stored in a memory location. These values may be programmed by a user, or may be determined by the microprocessor as part of step 304 described above. The microprocessor may be programmed to compare these stored threshold values with a stored value of the measured fluid variable, obtained during step 302, and to output a signal or to perform a certain process based on the result of the comparison. Sensed values may also be outputted over lines 114 (referring to FIG. 1) to controller 100, and the comparison performed at the controller. It is to be appreciated that numerous other methods of performing the comparison step are known to those of skill in the art and may be utilized.

If it is determined that the fluid variable is not within the range, step 310 of resetting the timer is performed and steps 302 to 308 are repeated. This procedure, when repeatedly performed, indicates that the sensor connection port is not plugged.

If it is determined that the fluid variable is within the established range, step 312 of determining whether the timer has expired is performed. If the timer has not expired, step 306 of measuring the fluid variable again is performed, and step 308 of determining whether the fluid variable is within the range is repeated. This procedure may be repeated until either the step of determining whether the fluid variable is within the range produces a negative output (indicating that the fluid variable is no longer within the range), or the step of determining whether the timer has expired produces a positive output (indicating that the timer has expired). If it is determined the fluid variable is within the range and that the timer has expired, this indicates that the fluid variable has not fluctuated by the amount expected, which may indicate a plugged sensor port condition. Thus, a step 314 of signaling a plugged port condition is performed. The system may then be manually reset (step 316) and the plugged port signal cleared (step 318). Step 310 of resetting the timer is then performed, and the procedure begins again, as shown. If the system is not manually reset, the plugged port condition may continue to be checked, including steps 320 of measuring the fluid variable and step 322 of determining whether the fluid variable is within the range, and the condition signal and timer may be reset when the plugged port condition is cleared (step 318). Once the timer is reset, step 310, the procedure may be repeated. A corrective action to clear the plugged sensor port may be initiated in response to the signal indicating a plugged port condition. The sensor mechanism may also be connected to a remote device, such as a remote display or alarm, and may provide information regarding a condition of the port, i.e. plugged or clear, to the remote device.

The detection method of FIG. 3 continuing to run after a plugged port has been detected provides several useful options. Statistically, there may be times when the fluid variable does not vary by the expected amount during the time interval. Thus, step 314 may signal a plugged port only if the expected variation is not detected for two or more consecutive time intervals, or in accordance with some other criteria. Further, since the plugged sensor port indication may be spurious, or a detected plug may spontaneously clear, if after a plug is detected, normal outputs are subsequently detected, a suitable output may be provided to indicate that the port is no longer plugged.

According to one embodiment, the method described above, and variations thereof, may be implemented as an algorithm or program running on one or more processors in a computer environment. For example, the algorithm may be encoded on a microprocessor which may be incorporated as part of the sensor mechanism. Alternatively, the algorithm may be encoded on a computer readable medium that may be loaded on a personal computer, a microprocessor, or other dedicated controller that may form part of, or be connected to, the sensor mechanism, for example controller 100. In another example, the algorithm may be encoded on a programmable logic device that again may form part of, or be connected to, the sensor mechanism. According to yet another example, the algorithm may be encoded on a carrier wave that may be transmitted to a microprocessor or a controller located at the sensor mechanism. It is to be appreciated that numerous devices that may execute algorithms encoded on numerous types of computer readable media are known to those of skill in the art, and are intended to be included in this disclosure. Hence, the examples described above are for purposes of illustration only, and are not intended to be limiting.

Referring again to FIG. 1, according to another embodiment, the apparatus described above may further include a device for clearing the plugged sensor port once it is detected. This device may form part of the sensor mechanism, may be connected to the sensor mechanism, or may be independently controlled, for example by controller 100. The clearing device is located in the sensor port, regardless of the how it is controlled, since it is a plugged condition of the sensor port that is detected using the above-described method. Once the plugged port has been detected, the controller or sensor mechanism may actuate the clearing device to clear the obstruction in the plugged sensor port.

Figure 4:
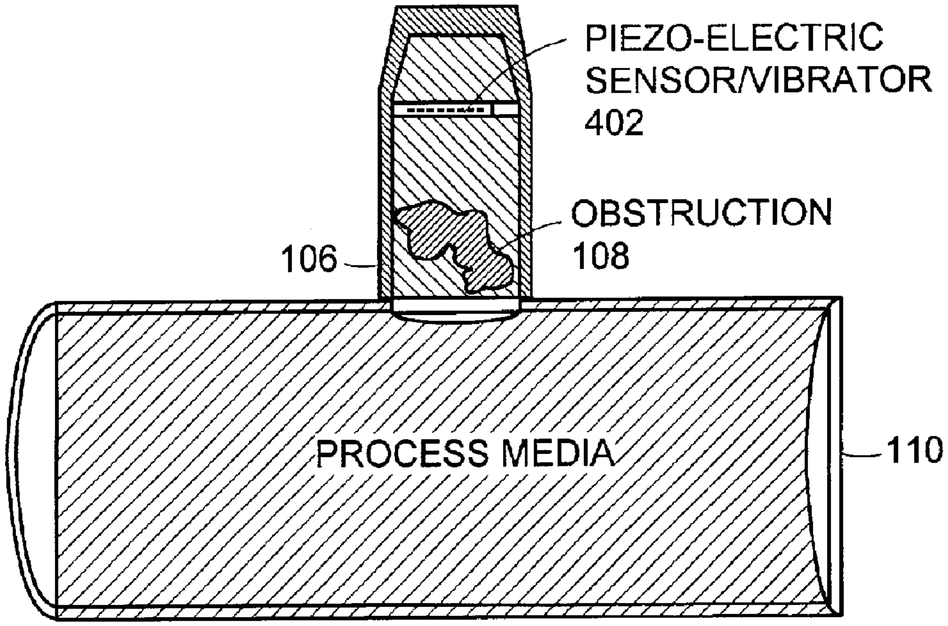
FIGS. 4, 5, 6, 7, 8, 9*a*, 9*b*, 9*c* and 10 are diagrammatic illustrations of various examples of devices for clearing a plugged port.

According to one example, illustrated in FIG. 4, a piezoelectric sensor/vibrator 402 is provided in the sensor port 106. The piezoelectric sensor/vibrator serves both as a sensor mechanism and as a device for clearing the sensor port when a plug is detected. This arrangement has the advantage of minimizing the necessary components for the sensor mechanism and clearing device, as a separate sensor mechanism is not required, which may result in a less expensive device. The piezoelectric sensor/vibrator may typically operate in sensor mode, to provide measurements of the fluid variable. The piezoelectric sensor/vibrator may be excited with a voltage or current in response to a plugged port being indicated, to create a mechanical vibration which may dislodge the obstruction in the port.

Figure 5:
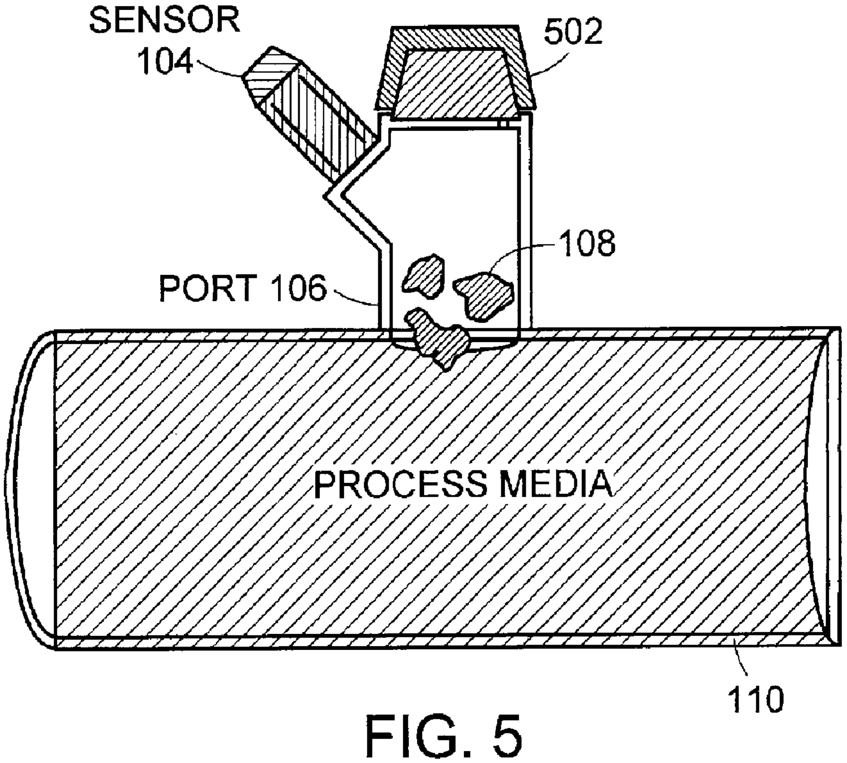

According to another example, illustrated in FIG. 5, the device for clearing the plugged sensor port comprises a vibrator 502 located in the sensor port 106. Examples of vibrators that may be used are piezoelectric vibrators, ultrasonic vibrators, or any type of suitable vibrator that may be actuated in response to a plugged port condition being indicated. In this arrangement, the vibrator is provided separate from the sensor mechanism 104. However, the vibrator shares a common port connection 106 with the sensor mechanism in order to be able to clear obstructions 108 sensed in the sensor port by the sensor mechanism. The vibrator may be actuated by a signal from the sensor mechanism or the controller to clear the obstruction once a plugged port has been detected. The vibrator may also be actuated in response to a signal from an external controller, or may include a timer and be programmed to vibrate after a predetermined time interval, whether or not a plugged port has been detected, to prevent a plug from forming.

Figure 6:
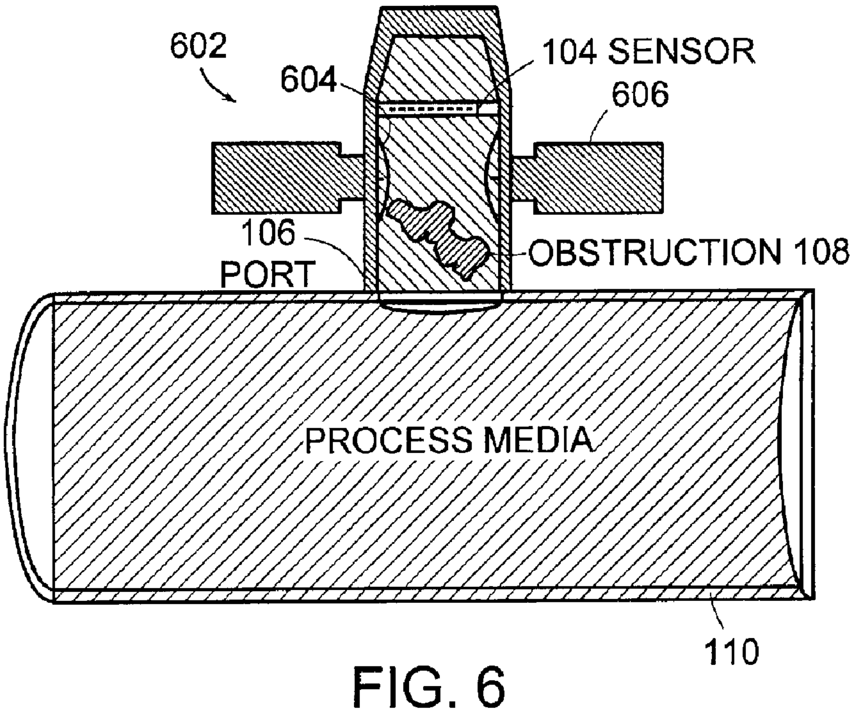

Another example of a device for clearing the plugged port includes a pinch valve mechanism, as illustrated in FIG. 6. The pinch valve mechanism 602 comprises pinch valve members 604 located on opposing sidewalls of the sensor port 106, and valve actuators 606 coupled to each of the pinch valve members. The valve actuators may actuate the pinch valve members in response to a signal indicating that the port is plugged. When actuated, the pinch valve members move toward each other, thus narrowing the port and squeezing the obstruction 108 out of the port. The pinch valve mechanism may be controlled by the sensor mechanism or by the controller, as described above in reference to the piezoelectric and ultrasonic vibrators.

Figure 7:
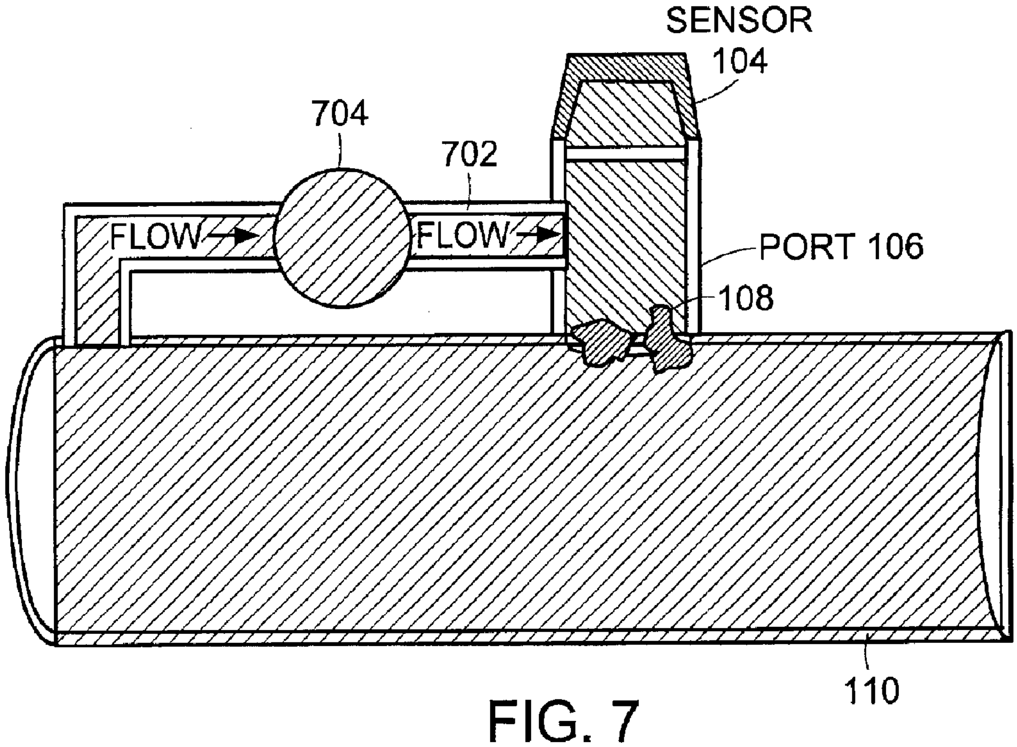

In another example, illustrated in FIG. 7, the sensor port 106 may be connected to the apparatus 110 containing the fluid of the process via an additional channel 702. This additional channel includes a pilot valve 704 that controls the flow of the fluid through channel 702. The pilot valve may include an actuator that may open or close the valve in response to a signal received from the sensor mechanism 104 after a plugged port condition in sensor port 106 is detected. Alternatively, the actuator may be controlled by controller 100, or by a signal originating from another source. Opening the pilot valve allows the fluid from the process to flow through channel 702 into the sensor port 106, which may cause turbulence or currents which may dislodge obstruction 108 in the sensor port, thus clearing the port. Alternatively, selectively closing and opening the valve may utilize variations in the pressure of the fluid in the channel to dislodge the obstruction in the sensor port.

Figure 8:
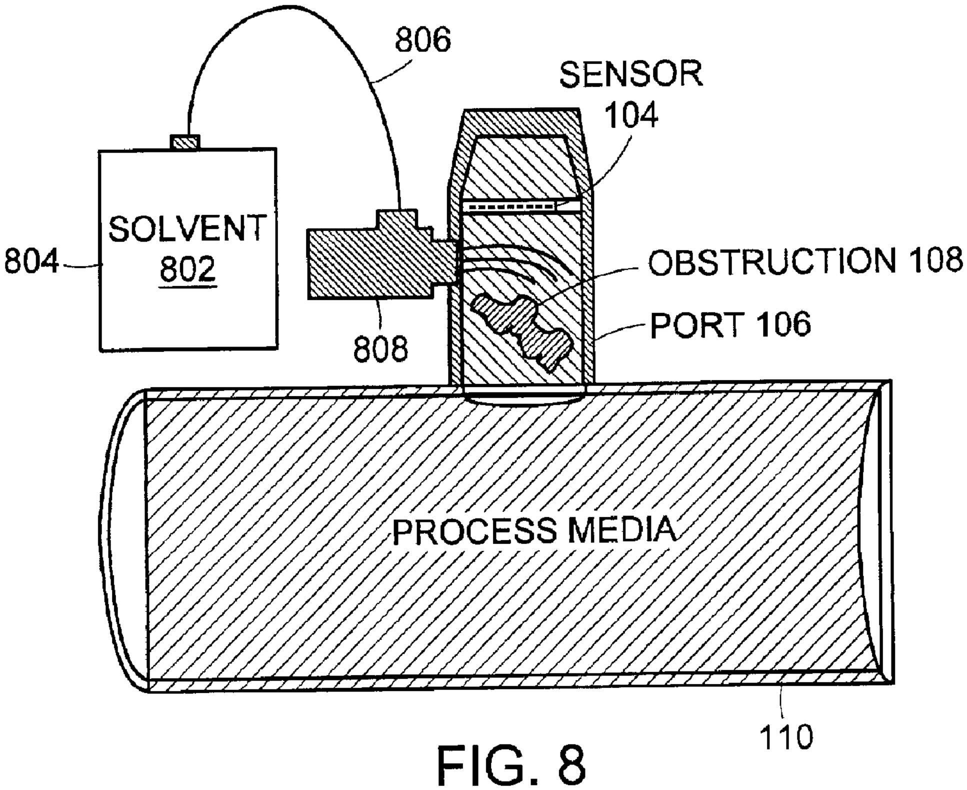

FIG. 8 illustrates another example of a method for clearing the plugged port, including injecting a solvent 802 into the port in order to dissolve the obstruction. According to this arrangement, the device for clearing the port includes a vessel 804 for storing the solvent, the vessel being connected to the port sensor 106 via a pipe 806 and a valve mechanism 808. The valve mechanism includes an actuator that may open the valve, thus allowing the solvent to flow into the sensor port, in response to a plugged port signal being received from the sensor mechanism or controller. The type of solvent may be chosen based on known characteristics of the fluid contained in the apparatus 100, and likely constituents of the debris 108. Similarly, the amount of solvent injected into the port may be based on known characteristics of likely obstructions.

Figure 9A:
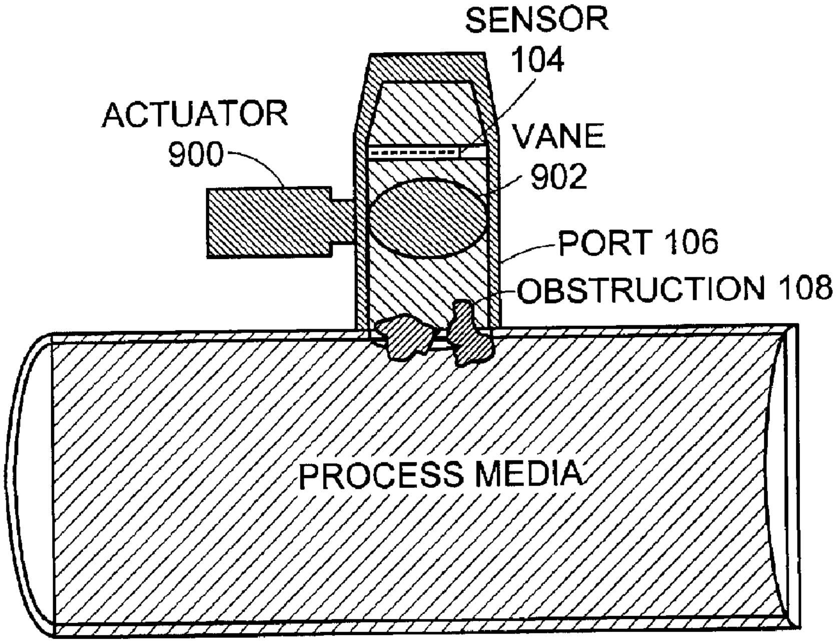
Figure 9B:
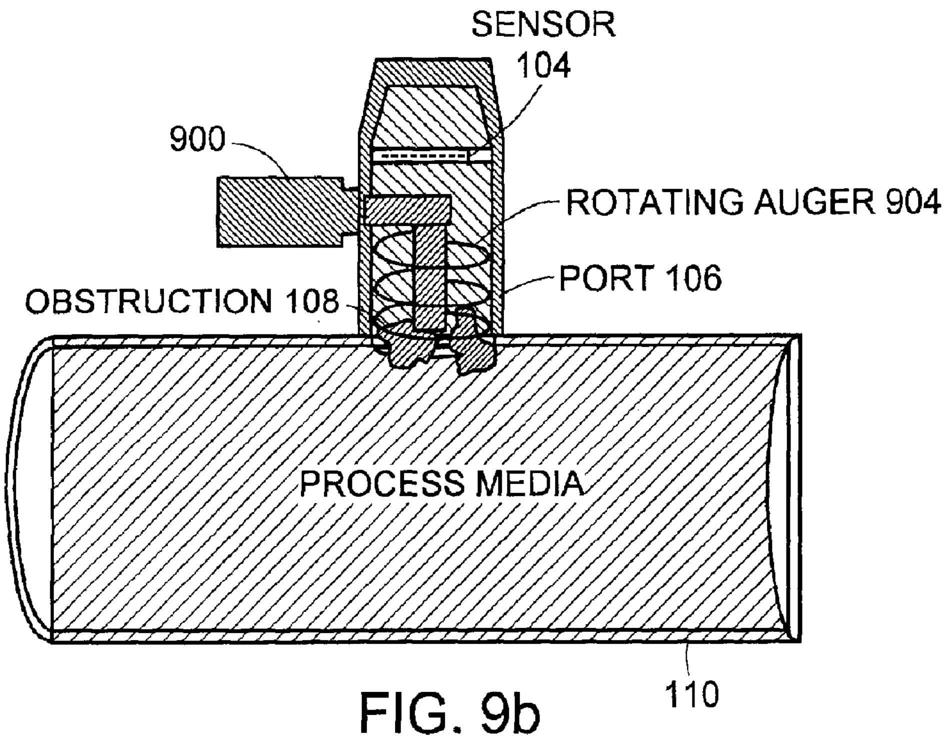
Figure 9C:
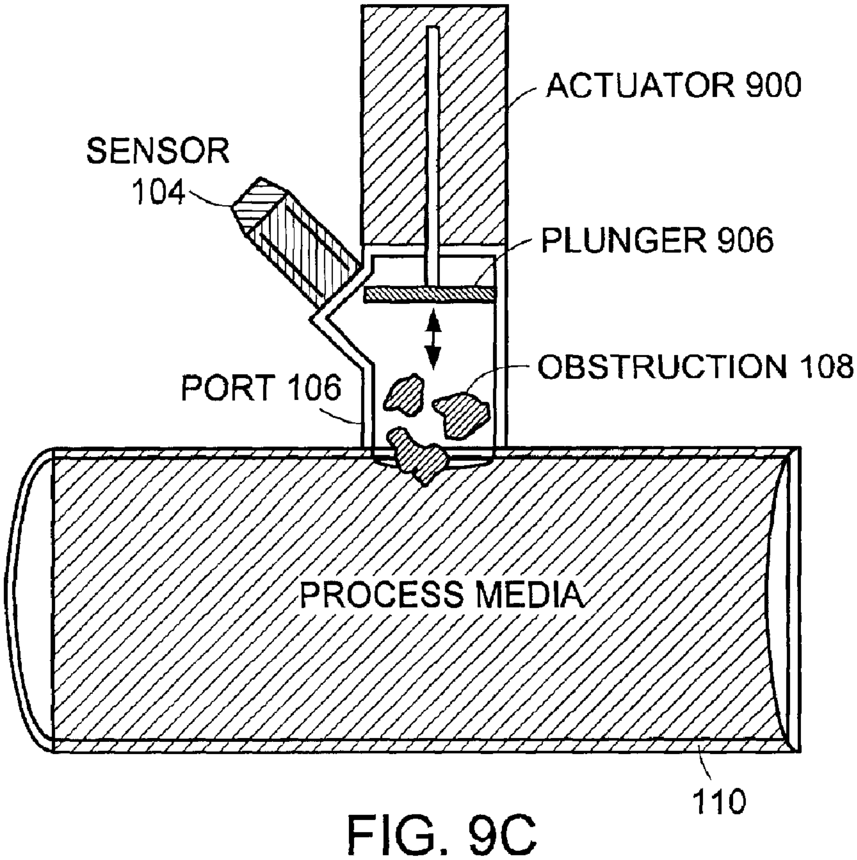

Referring to FIGS. 9*a–c*, according to yet another example, a physical device for clearing the port may be mounted in the sensor port. This device is coupled to an actuator 900 that is responsive to a plugged port signal from the sensor mechanism or from the controller. The clearing device may comprise any suitable mechanical device movable within the port to force the obstruction out of the port. For example, the device may be a rotatable vane 902, or butterfly valve, as illustrated in FIG. 9*a*, that creates turbulence in the port when actuated. The device may be a rotating auger 904 that rotates when actuated to break up the obstruction or force it out of the port, as illustrated in FIG. 9*b*. Alternatively, the device may include a plunger 906 actuated by a solenoid, screw, magnetic drive, or other suitable actuator. The plunger extends downwardly into the port when actuated to force the obstruction out, as illustrated in FIG. 9*c*.

Figure 10:
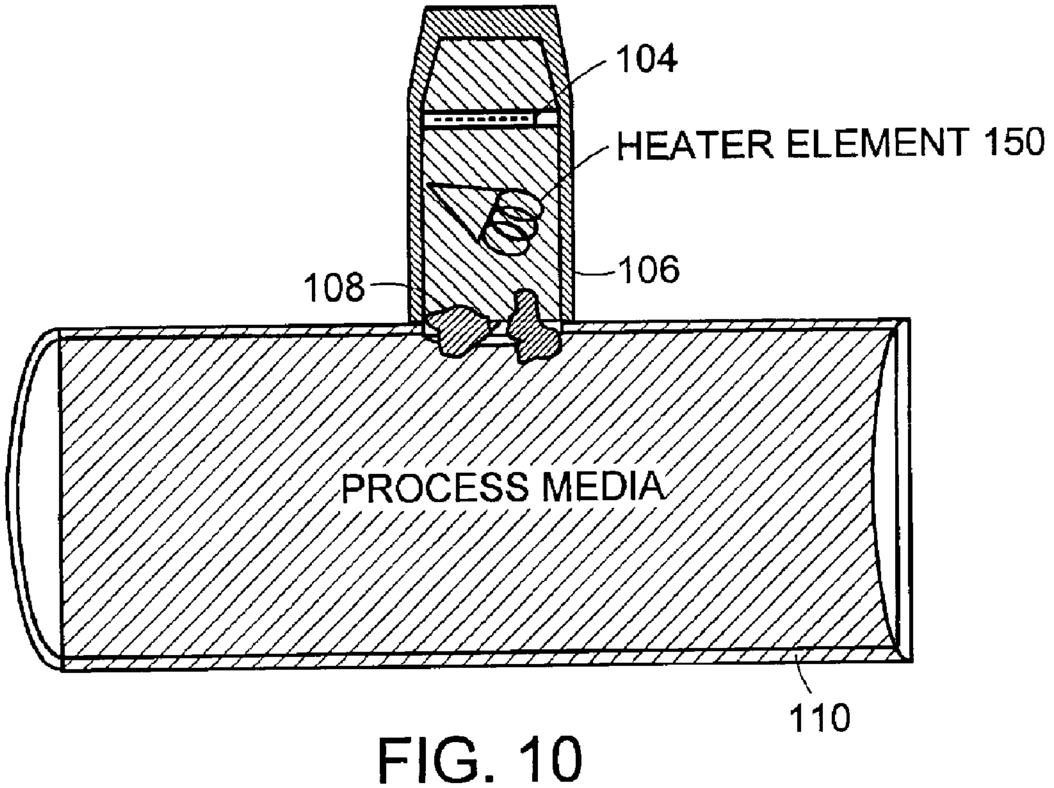

According to yet another example, illustrated in FIG. 10, the device for clearing the port may include an electric heater 150 that, when actuated, may heat the fluid in the sensor port to cause a softening of the obstruction. The heater may heat the fluid to its boiling point, which would create turbulence and further dislodge the obstruction. In one example, the heating element may include a laser that may heat the fluid, or may directly heat the obstruction, to, for example, dissolve it into smaller pieces.

It is to be appreciated that the foregoing examples are for purposes of illustration only, and the device for clearing the port may include many other suitable mechanisms known to those of skill in the art.

Having thus described various illustrative embodiments, and aspects thereof, it is to be appreciated that modifications or variations may be apparent to those skilled in the art. Such modifications or variations are intended to be covered by this disclosure, and the foregoing discussion is by way of example only and not intended to be limiting. The scope of the invention should be defined by proper construction of the appended claims and their equivalents.

What is claimed is:

1. A method of detecting a plugged sensor port in a system containing a fluid being monitored comprising steps of:

establishing a range beyond which a fluid variable is expected to vary within a predetermined time interval;

measuring the fluid variable to provide a measured fluid variable;

reestablishing a threshold of the range in response to the fluid variable exceeding the threshold of the range; and indicating the plugged sensor port in response to the measured fluid variable remaining within the range for the predetermined time interval.

2. The method as claimed in claim 1, wherein the establishing step is at least selectively performed in response to the measured fluid variable being outside the range.

3. The method as claimed in claim 1, wherein the establishing step comprises determining an upper threshold value and a lower threshold value for the fluid variable.

4. The method as claimed in claim 1, wherein the steps of measuring the fluid variable and establishing the range are performed responsive to the fluid variable being outside the range.

5. The method as claimed in claim 1, wherein the step of establishing the range comprises:

determining an upper threshold of the fluid variable; and determining a lower threshold of the fluid variable.

6. The method as claimed in claim 1, wherein the indicating step is performed in response to the fluid variable remaining within the range for at least two consecutive predetermined time intervals.

7. The method as claimed in claim 1, further comprising a step of performing a corrective action to clear the plugged sensor port in response to the indication that the sensor port is plugged.

8. The method as claimed in claim 1, further comprising a step of providing information regarding a condition of the sensor port to a remote location.

9. The method as claimed in claim 1, further comprising a step of displaying information regarding the sensor port for access by a user.

10. The method of claim 1, wherein the range is established relative to a nominal operating value of the fluid variable.

11. A device that detects a plugged sensor port in a system containing a fluid being monitored, the device comprising:

a sensor mechanism that senses a fluid variable through the sensor port;

a controller that establishes a range beyond which the fluid variable is expected to vary within a predetermined time interval, determines whether the fluid variable is within the range, reestablishes a threshold of the range in response to the fluid variable exceeding the threshold of the range, and indicates a plugged sensor port in response to the fluid variable remaining within the range for the predetermined time interval.

12. The device as claimed in claim 11, wherein the controller comprises:

a timer; and a comparator that compares the fluid variable to an upper threshold value of the range and a lower threshold value of the range to determine whether the fluid variable is within the range.

13. The device as claimed in claim 11, further comprising a mechanism that clears the plugged sensor port, responsive to a signal from the controller indicating a plugged sensor port.

14. A device for detecting a plugged sensor port connection in a fluid-containing apparatus monitoring a process, the device comprising:

a sensor that measures a fluid variable through the port;

a first means for determining a range beyond which the fluid variable is expected to vary during a predetermined time interval;

a second means, coupled to the sensor, for determining whether the fluid variable is within the range;

a third means for providing an indication of a plugged port responsive to the fluid variable remaining within the range for the predetermined time interval; and a fourth means for reestablishing a threshold of the range in response to the fluid variable exceeding the threshold of the range.

15. The device as claimed in claim 14, wherein the first means determines the range by establishing an upper threshold and a lower threshold for the range of the fluid variable.

16. The device as claimed in claim 14, wherein the predetermined time interval is programmable based on characteristics of the process being monitored.

17. The device as claimed in claim 14, further comprising an I/O port coupled to the third means and adapted to provide to a remote location an indication that the port connection is plugged.

18. The device as claimed in claim 14, wherein the first means determines the range based on a measured value of the fluid variable.

19. The device as claimed in claim 18, wherein the first means determines the range based on a current measured value of the fluid variable, responsive to the current measured value being outside the range.

20. The device as claimed in claim 14, wherein at least one of the range and the time interval is programmable, and wherein the device further comprises a user interface adapted to receive an input from a user to set one of the range and the time interval.

21. The device as claimed in claim 20, wherein the user interface includes an output for providing information to the user.

22. The device as claimed in claim 21, wherein the output comprises a display that provides information regarding the port connection for access by an operator.

23. The device as claimed in claim 22, wherein the information comprises an indication that the port connection is plugged.

24. The device as claimed in claim 14, further comprising a means for clearing the plugged port connection.

25. The device as claimed in claim 24, wherein the means for clearing the plugged port connection comprises a vibrator that vibrates in response to an actuating signal, thereby clearing the plugged port.

26. The device as claimed in claim 24, wherein the means for clearing the plugged port connection comprises a heater that heats the fluid in response to the indication of a plugged port.

27. The device as claimed in claim 24, wherein the means for clearing the plugged port connection comprises a vessel containing a solvent, the vessel being connected to the sensor port via a valve mechanism, and wherein the valve mechanism is actuated to allow the solvent to enter the sensor port in response to the indication of the plugged port.

28. The device as claimed in claim 24, wherein the means for clearing the plugged port connection comprises a movable mechanical device that moves in response to an actuation signal, thereby clearing the plugged port.

29. The device as claimed in claim 28, wherein the movable mechanical device comprises at least one of: a pinch valve mechanism, a rotatable vane, a rotatable auger and a butterfly valve.

30. A method of detecting a plugged sensor port in a system containing a fluid being monitored, comprising steps of:

establishing a range beyond which a fluid variable is expected to vary within a predetermined time interval, determining an upper threshold value and a lower threshold value for the fluid variable, and calculating the upper threshold value and the lower threshold value as a percentage of one of an expected operating value, and the measured fluid variable;

measuring the fluid variable to provide a measured fluid variable; and indicating the plugged sensor port in response to the measured fluid variable remaining within the range for the predetermined time interval.

31. A method of detecting a plugged sensor port in a system containing a fluid being monitored, comprising steps of:

establishing a range beyond which a fluid variable is expected to vary within a predetermined time interval;

measuring the fluid variable to provide a measured fluid variable; and indicating the plugged sensor port in response to the measured fluid variable remaining within the range for the predetermined time interval; and selecting the predetermined time interval based on characteristics of the process being monitored.

32. A method of detecting a plugged sensor port in a system containing a fluid being monitored, comprising steps of:

establishing a range beyond which a fluid variable is expected to vary within a predetermined time interval;

measuring the fluid variable to provide a measured fluid variable; and indicating the plunged sensor port in response to the measured fluid variable remaining within the range for the predetermined time interval, wherein the step of indicating the plugged sensor port includes indicating the plugged sensor port in response to the measured fluid variable remaining within the range for at least two consecutive predetermined time intervals.

33. A method of detecting a plugged port connection in a fluid-containing apparatus involved in a process, the method comprising steps of:

measuring a fluid variable through the port to provide a measured fluid variable;

determining a range, based on the measured fluid variable, beyond which the fluid variable is expected to vary in a predetermined time interval, and determining a minimum amount by which the fluid variable is expected to vary above and below a nominal operating value, over a selected time interval;

re-measuring the fluid variable; and indicating that the port connection is plugged responsive to the fluid variable remaining within the range for the predetermined time interval.

34. A method of detecting a plugged port connection in a fluid-containing apparatus involved in a process, the method comprising steps of:

measuring a fluid variable through the port to provide a measured fluid variable;

determining a range, based on the measured fluid variable, beyond which the fluid variable is expected to vary in a predetermined time interval;

re-measuring the fluid variable;

indicating that the port connection is plugged responsive to the fluid variable remaining within the range for the predetermined time interval;

receiving an input from a user; and providing a control signal responsive to the input to program at least one of the range and the time interval.

35. A device that detects a plugged sensor port in a system containing a fluid being monitored, the device comprising:

a sensor mechanism that senses a fluid variable through the sensor port; and a controller that establishes a range beyond which the fluid variable is expected to vary within a predetermined time interval, determines whether the fluid variable is within the range, and indicates a plugged sensor port in response to the fluid variable remaining within the range for the predetermined time interval, wherein the controller establishes the predetermined time interval based on characteristics of the fluid variable.

36. A device that detects a plugged sensor port in a system containing a fluid being monitored, the device comprising:

a sensor mechanism that senses a fluid variable through the sensor port;

a controller that establishes a range beyond which the fluid variable is expected to vary within a predetermined time interval, determines whether the fluid variable is within the range, and indicates a plugged sensor port in response to the fluid variable remaining within the range for the predetermined time interval; and a mechanism that clears the plugged sensor port, responsive to a signal from the controller indicating a plugged sensor port, wherein the mechanism that clears the plugged sensor port includes a mechanical device, movable within the port to clear the port.

37. A method for detecting and clearing a plugged sensor port in a system containing a fluid being monitored via the sensor port, the method comprising steps of:

sensing a fluid variable through the port to provide a measured fluid variable;

detecting a plugged sensor port based on the measured fluid variable remaining within a predetermined range for a predetermined period of time;

reestablishing a threshold of the range in response to the fluid variable exceeding the threshold of the range; and actuating a clearing mechanism to clear the plugged sensor port responsive to the plugged sensor port being detected.

38. A computer readable medium encoded with at least one program for execution on at least one processor, the program performing a method for detecting a plugged sensor port connection in a system relating to a process being monitored, the method comprising steps of:

establishing an operating value of a fluid variable;

determining a range beyond which the fluid variable is expected to vary within a predetermined time interval;

measuring the fluid variable;

determining whether the fluid variable is within the range;

reestablishing a threshold of the range in response to the fluid variable exceeding the threshold of the range; and indicating a plugged port condition in response to the fluid variable remaining within the range for the predetermined time interval.

39. A device that detects a fault condition relating to a process being monitored, the device comprising:

a sensor that measures a fluid variable; and a controller that establishes a range beyond which the fluid variable is expected to vary within a predetermined time interval, determines whether the fluid variable is within the range and indicates the fault condition in response to the fluid variable remaining within the range for the predetermined time interval, wherein the controller establishes the predetermined time interval based on characteristics of the process being monitored.

40. A method of detecting a plugged sensor port in a system containing a fluid being monitored, comprising steps of:

establishing a range beyond which a fluid variable is expected to vary within a predetermined time interval;

measuring the fluid variable to provide a measured fluid variable; and indicating the plugged sensor port in response to the measured fluid variable remaining within the range for the predetermined time interval; and reestablishing the range in response to the fluid variable exceeding a threshold of the range.

41. A device that detects a plugged sensor port in a system containing a fluid being monitored, the device comprising:

a sensor mechanism that senses a fluid variable through the sensor port;

a controller that establishes a range beyond which the fluid variable is expected to vary within a predetermined time interval, determines whether the fluid variable is within the range, and indicates a plugged sensor port in response to the fluid variable remaining within the range for the predetermined time interval; and a mechanism that clears the plugged sensor port, responsive to a signal from the controller indicating a plugged sensor port, wherein the mechanism that clears the plugged sensor port includes a vibrator that vibrates in response to an actuating signal, thereby clearing the plugged port.

42. The device as claimed in claim 41, wherein the vibrator includes a piezoelectric sensor/vibrator.

43. A device that detects a fault condition relating to a process being monitored, the device comprising:

a sensor that measures a fluid variable; and a controller that establishes a range beyond which the fluid variable is expected to vary within a predetermined time interval, determines whether the fluid variable is within the range, reestablishes a threshold of the range in response to the fluid variable exceeding the threshold of the range, and indicates the fault condition in response to the fluid variable remaining within the range for the predetermined time interval.

44. The device as claimed in claim 43, wherein the controller comprises:

a timer; and a comparator that compares the fluid variable with an upper threshold value and a lower threshold value of the range to determine whether the fluid variable is within the range.

* * * * *